United States Patent
Oxford

(10) Patent No.: US 8,789,610 B2
(45) Date of Patent: Jul. 29, 2014

(54) METHODS OF CASING A WELLBORE WITH CORRODABLE BORING SHOES

(75) Inventor: James Andy Oxford, Magnolia, TX (US)

(73) Assignee: Baker Hughes Incorporated, Houston, TX (US)

(*) Notice: Subject to any disclaimer, the term of this patent is extended or adjusted under 35 U.S.C. 154(b) by 480 days.

(21) Appl. No.: 13/083,346

(22) Filed: Apr. 8, 2011

(65) Prior Publication Data
US 2012/0255743 A1 Oct. 11, 2012

(51) Int. Cl.
*E21B 29/00* (2006.01)
*E21B 17/14* (2006.01)

(52) U.S. Cl.
USPC ......... 166/376; 166/242.8; 175/402; 175/425

(58) Field of Classification Search
USPC ................ 166/376, 242.8; 175/402, 425
See application file for complete search history.

(56) References Cited

U.S. PATENT DOCUMENTS

| | | | |
|---|---|---|---|
| 2,368,419 A * | 1/1945 | McGivern et al. | 166/222 |
| 6,062,326 A | 5/2000 | Strong et al. | |
| 7,182,156 B2 | 2/2007 | Charland et al. | |
| 7,228,904 B2 | 6/2007 | Todd et al. | |
| 7,395,882 B2 | 7/2008 | Oldham et al. | |
| 8,167,059 B2 * | 5/2012 | Oldham et al. | 175/57 |
| 8,205,693 B2 * | 6/2012 | Oldham et al. | 175/402 |
| 8,225,887 B2 * | 7/2012 | Oldham et al. | 175/402 |
| 8,297,364 B2 * | 10/2012 | Agrawal et al. | 166/376 |
| 8,327,931 B2 * | 12/2012 | Agrawal et al. | 166/193 |
| 8,403,037 B2 * | 3/2013 | Agrawal et al. | 166/193 |
| 8,413,727 B2 * | 4/2013 | Holmes | 166/376 |
| 2005/0183892 A1 | 8/2005 | Oldham et al. | |
| 2008/0105438 A1 | 5/2008 | Jordan et al. | |
| 2008/0135304 A1 * | 6/2008 | Duggan et al. | 175/325.2 |
| 2010/0252331 A1 | 10/2010 | High et al. | |
| 2010/0270086 A1 * | 10/2010 | Matthews et al. | 175/425 |
| 2010/0294510 A1 * | 11/2010 | Holmes | 166/376 |
| 2011/0132612 A1 * | 6/2011 | Agrawal et al. | 166/317 |
| 2011/0180261 A1 * | 7/2011 | Beattie et al. | 166/285 |
| 2011/0186354 A1 * | 8/2011 | Smith et al. | 175/57 |
| 2011/0259604 A1 * | 10/2011 | Oldham et al. | 166/380 |
| 2012/0255743 A1 * | 10/2012 | Oxford | 166/380 |
| 2013/0277121 A1 * | 10/2013 | Stevens et al. | 175/425 |

OTHER PUBLICATIONS

Baker Hughes, Baker Hughes Announces New Technologize, Mar. 9, 2011, PRNewswire, New Provided by Acquire Media, 1 page.
Nie, Patents of Methods to Prepare Intermetallic Matrix Composites: A Review, Recent Patents on Materials Science (2008), Vo. 1, pp. 232-240.
U.S. Appl. No. 12/633,682, filed Dec. 8, 2009 and entitled Nanomatrix Powder Metal Compact.

(Continued)

*Primary Examiner* — Jennifer H Gay
(74) *Attorney, Agent, or Firm* — TraskBritt

(57) ABSTRACT

Earth-boring casing shoes include a crown configured for at least one of drilling and reaming a wellbore when the crown is attached to a section of casing and the casing is advanced into a wellbore. The crown includes a body comprising a corrodible composite material, and at least one cutting structure carried on the body. The casing shoes further include a connection structure configured for attachment to a section of casing. Methods are used to form such casing shoes, and such casing shoes are used to install casing within wellbores.

18 Claims, 10 Drawing Sheets

(56) References Cited

OTHER PUBLICATIONS

U.S. Appl. No. 12/633,686, filed Dec. 8, 2009 and entitled Coated Metallic Powder and Method of Making the Same.
U.S. Appl. No. 12/633,678, filed Dec. 8, 2009 and entitled Engineered Powder Compact Composite Material.
U.S. Appl. No. 12/633,683, filed Dec. 8, 2009 and entitled Telescopic Unit With Dissolvable Barrier.
U.S. Appl. No. 12/633,662, filed Dec. 8, 2009 and entitled Dissolvable Tool and Method.
U.S. Appl. No. 12/633,677, filed Dec. 8, 2009 and entitled Multi-Component Disappearing Tripping Ball and Method for Making the Same.
U.S. Appl. No. 12/633,668, filed Dec. 8, 2009 and entitled Dissolvable Tool and Method.
U.S. Appl. No. 12/633,688, filed Dec. 8, 2009 and entitled Method of Making a Nanomatrix Powder Metal Compact.

* cited by examiner

METHODS OF CASING A WELLBORE WITH CORRODABLE BORING SHOES

TECHNICAL FIELD

The present invention relates to earth-boring shoes configured for attachment to a section of wellbore casing, to methods of manufacturing such earth-boring shoes, and to methods of adapting such earth-boring shoes for attachment to a section of wellbore casing.

BACKGROUND

The drilling of wells for oil and gas production conventionally employs longitudinally extending sections or so-called "strings" of drill pipe to which, at one end, is secured a drill bit of a larger diameter. After a selected portion of the borehole has been drilled, the borehole is usually lined or cased with a string or section of casing. Such a casing or liner usually exhibits a larger diameter than the drill pipe and a smaller diameter than the drill bit. Therefore, drilling and casing according to the conventional process typically requires sequentially drilling the borehole using drill string with a drill bit attached thereto, removing the drill string and drill bit from the borehole, and disposing casing into the borehole. Further, often after a section of the borehole is lined with casing, which is usually cemented into place, additional drilling beyond the end of the casing may be desired.

Unfortunately, sequential drilling and casing may be time consuming because, as may be appreciated, at the considerable depths reached during oil and gas production, the time required to implement complex retrieval procedures to recover the drill string may be considerable. Thus, such operations may be costly as well, since, for example, the beginning of profitable production can be greatly delayed. Moreover, control of the well may be difficult during the period of time that the drill pipe is being removed and the casing is being disposed into the borehole.

Some approaches have been developed to address the difficulties associated with conventional drilling and casing operations. Of initial interest is an apparatus, which is known as a "reamer shoe," that has been used in conventional drilling operations. Reamer shoes have become available relatively recently and are devices that are able to drill through modest obstructions within a borehole that has been previously drilled. In addition, the reamer shoe may include an inner section manufactured from a material that is drillable by rotary drill bits. Accordingly, when cemented into place, reamer shoes usually pose no difficulty to a subsequent drill bit. For instance, U.S. Pat. No. 6,062,326 to Strong et al. discloses a casing shoe or reamer shoe in which the central portion thereof may be configured to be drilled through. In addition, U.S. Pat. No. 6,062,326 to Strong et al. discloses a casing shoe that may include diamond cutters over the entire face thereof, if it is not desired to drill therethrough. Such reamers that are configured for attachment to a casing string are referred to hereinafter as "reamer shoes."

As a further extension of the reamer shoe concept, in order to address the problems with sequential drilling and casing, drilling with casing is gaining popularity as a method for initially drilling a borehole, wherein the casing is used as the drilling conduit and, after drilling, the casing is cemented into and remains within the wellbore to act as the wellbore casing. Drilling with casing employs a drill bit that is configured for attachment to the casing string instead of a drill string, so that the drill bit functions not only to drill the earth formation, but also to guide the casing into the wellbore. This may be advantageous as the casing is disposed into the borehole as it is foamed by the drill bit, and therefore eliminates the necessity of retrieving the drill string and drill bit after reaching a target depth where cementing is desired. Such drill bits that are configured for attachment to a casing string are referred to hereinafter as "drill shoes."

As used herein, the terms "earth-boring casing shoes" and "casing shoes" mean and include any device that is configured for attachment to an end of a section of casing and used for at least one of drilling a wellbore, reaming a previously drilled wellbore, and guiding casing through a previously drilled wellbore, as the section of casing to which the device is attached is advanced into a subterranean formation. Earth-boring shoes and boring shoes include, for example, drill shoes, reamer shoes, casing shoes configured to merely guide casing through a wellbore and ensure that the wellbore diameter remains as drilled (i.e., has not decreased as sometimes occurs in reactive or sloughing formations), and shoes that both drill and ream as casing to which they are attached is advanced into a subterranean formation.

BRIEF SUMMARY

In some embodiments, the present disclosure includes earth-boring casing shoes that include a crown configured for at least one of drilling and reaming a wellbore when the crown is attached to a section of casing and the casing is advanced into a wellbore. The crown includes a body comprising a composite material, and at least one cutting structure carried on the body. The composite material of the body includes a discontinuous metallic phase dispersed within a corrodible matrix phase. The discontinuous metallic phase comprises a metal or metal alloy, and the corrodible matrix phase comprises at least one of a ceramic and an intermetallic compound. The casing shoes further include connection structure configured for attachment to a section of casing.

In additional embodiments, the present disclosure includes methods of forming an earth-boring casing shoe. In accordance with such methods, a powder comprising metallic particles coated with at least one of a ceramic and an intermetallic compound is consolidated to faun a solid three-dimensional body comprising a discontinuous metallic phase dispersed within a corrodible matrix phase. The metallic phase comprises the metallic particles, and the corrodible matrix phase comprises the at least one of a ceramic and an intermetallic compound of the coating on the metallic particles. The solid three-dimensional body is machined to form a crown of the earth-boring casing shoe. At least one cutting structure carried on the body of the crown of the earth-boring casing shoe. A connection structure configured for attachment to a section of casing is also provided on the earth-boring casing shoe.

Yet further embodiments of the present disclosure include methods of casing a wellbore. In accordance with such methods, a casing shoe having at least one cutting structure is mounted on an end of a section of casing. The section of casing with the casing shoe thereon is advanced into a wellbore. A rate of corrosion of a body of the casing shoe within the wellbore is selectively increased to at least partially corrode the body of the casing shoe. Selectively increasing the rate of corrosion of the body may comprise an increase of a rate of corrosion of a corrodible matrix phase comprising at least one of a ceramic and an intermetallic compound in which a metallic phase is dispersed. An additional section of casing or drill pipe is advanced through the end of the section of casing and the at least partially corroded body of the casing shoe.

BRIEF DESCRIPTION OF THE SEVERAL VIEWS OF THE DRAWINGS

While the specification concludes with claims particularly pointing out and distinctly claiming what are regarded as embodiments of the present invention, the advantages of embodiments of this disclosure may be more readily ascertained from the following description of certain embodiments of the disclosure when read in conjunction with the accompanying drawings, in which:

DETAILED DESCRIPTION

Illustrations presented herein are, in some cases, not meant to be actual views of any particular material, casing shoe, or drilling assembly, but are merely idealized representations that are employed to describe embodiments of the present disclosure. Elements common between figures may retain the same numerical designation.

Figure 1A:
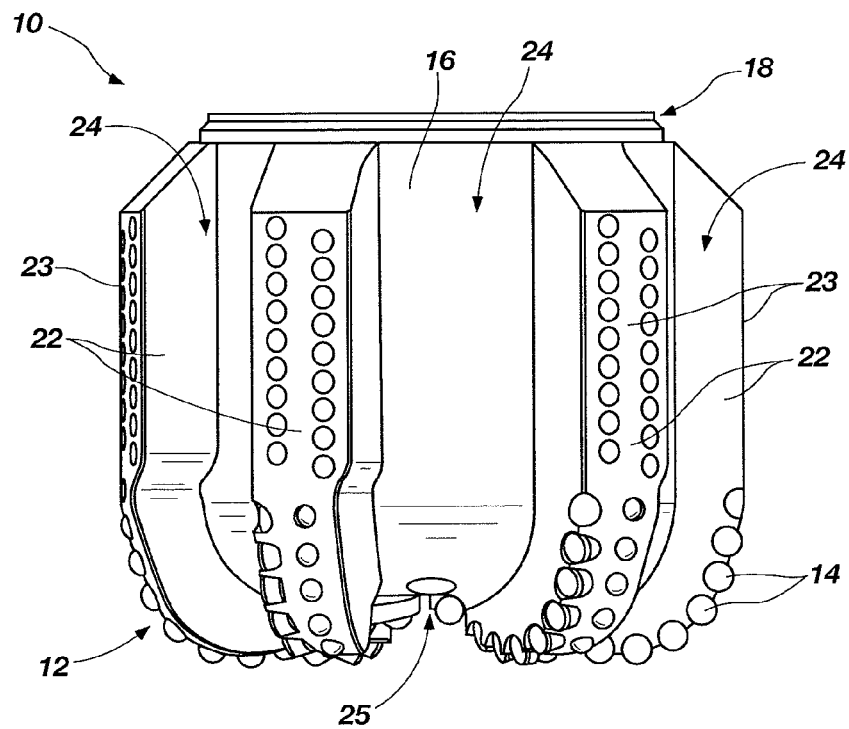
FIG. 1A is a side view of an embodiment of a casing shoe that includes a casing bit crown comprising a corrodible composite material.
Figure 1B:
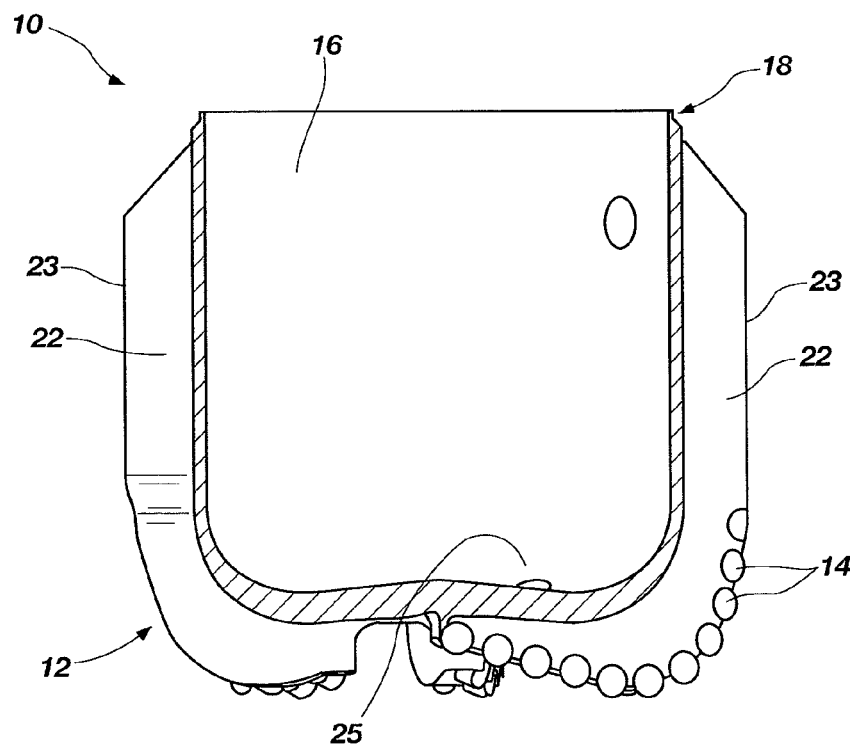
FIG. 1B is a cross-sectional side view of the casing shoe of FIG. 1A.

An embodiment of a casing shoe 10 is shown in FIGS. 1A and 1B. The casing shoe 10 includes a crown 12 configured for drilling a wellbore when the crown 12 is attached to a section of casing and the casing is advanced into a wellbore. Thus, the crown 12 includes at least one cutting structure 14 carried on a body 16 of the crown 12. The crown 12 also includes connection structure 18 configured for attachment to a section of casing. As discussed in further detail below, at least a portion of the body 16 of the crown 12 comprises a composite material that may be selectively corroded after using the casing shoe 10 for a period of service time. Thus, after using the crown 12, the body 16 of the crown 12 may be selectively corroded and degraded within the wellbore to allow additional casing sections and/or drill pipe to be inserted through the wellbore through and beyond the casing shoe 10.

The composite material of the body 16 of the crown 12 may comprise a corrodible composite material as disclosed in, for example, one or more of U.S. patent application Ser. No. 12/633,682, filed Dec. 8, 2009, published as U.S. Patent Application Publication No. 2011/0132143 A1, and entitled NANOMATRIX POWDER METAL COMPACT; U.S. patent application Ser. No. 12/633,686, filed Dec. 8, 2009, published as U.S. Patent Application Publication No. 2011/0135953 A1, and entitled COATED METALLIC POWDER AND METHOD OF MAKING THE SAME; U.S. patent application Ser. No. 12/633,678, filed Dec. 8, 2009, published as U.S. Patent Application Publication No. 2011/0136707 A1, and entitled METHOD OF MAKING A NANOMATRIX POWDER METAL COMPACT and entitled ENGINEERED POWDER COMPACT COMPOSITE MATERIAL; U.S. patent application Ser. No. 12/633,683, filed Dec. 8, 2009, now U.S. Pat. No. 8,297,364, and entitled TELESCOPIC UNIT WITH DISSOLVABLE BARRIER; U.S. patent application Ser. No. 12/633,662, filed Dec. 8, 2009, now U.S. Pat. No. 8,403,037, and entitled DISSOLVABLE TOOL AND METHOD; U.S. patent application Ser. No. 12/633,677, filed Dec. 8, 2009, now U.S. Pat. No. 8,327,931, and entitled MULTI-COMPONENT DISAPPEARING TRIPPING BALL AND METHOD FOR MAKING THE SAME; U.S. patent application Ser. No. 12/633,668, filed Dec. 8, 2009, published as U.S. Patent Application No. 2011/0132620 A1, now U.S. Pat. No. 8,528,633, issued Sep. 10, 2013, and entitled DISSOLVABLE TOOL AND METHOD; and U.S. patent application Ser. No. 12/633,688, filed Dec. 8, 2009, published as U.S. Patent Application No. 2011/0135530 A1, and entitled METHOD OF MAKING A NANOMATRIX POWDER METAL COMPACT, the disclosure of each of which application and patent is incorporated herein in its entirety by this reference.

In some embodiments, the body 16 of the crown 12 may comprise a plurality of blades 22 that define fluid courses 24 therebetween. Apertures 25 may be framed through the crown 12 for allowing fluid (e.g., drilling fluid and/or cement) to be pumped through the interior of the casing shoe 10, out through the apertures 25 in the crown 12, and into the annular space between the walls of the formation in which the wellbore is formed and the exterior surfaces of the casing shoe 10 and the casing sections to which the casing shoe 10 may be attached. For example, the apertures 25 may comprise fluid passageways extending through the body 16 of the crown 12. Optionally, nozzles (not shown) may be secured to the crown 12 within the apertures 25 to selectively tailor the hydraulic characteristics of the casing shoe 10. Cutting element pockets may be formed in the blades 22, and cutting structures 14 such as polycrystalline diamond compact (PDC) cutting elements may be secured within the cutting element pockets.

Also, each of blades 22 may include a gage region 23 that together define the largest diameter of the crown 12 and, thus, the diameter of any wellbore formed using the casing shoe 10. The gage regions 23 may be longitudinal extensions of the blades 22. Wear-resistant structures or materials may be provided on the gage regions 23. For example, tungsten carbide inserts, cutting elements, diamonds (e.g., natural or synthetic diamonds), or hardfacing material may be provided on the gage regions 23 of the crown 12.

In additional embodiments, the crown 12 may comprise other cutting and/or reaming structures such as, for example, deposits of hardfacing material (not shown) on the exterior surfaces of the crown 12. Such a hardfacing material may comprise, for example, hard and abrasive particles (e.g., diamond, boron nitride, silicon carbide, carbides or borides of titanium, tungsten, or tantalum, etc.) embedded within a metal or metal alloy matrix material (e.g., an iron-based, cobalt-based, or nickel-based metal alloy). Such deposits of hardfacing material may be shaped into protruding cutting structures on the exterior surfaces of the crown 12.

With continued reference to FIGS. 1A and 1B, the connection structure 18 on the casing shoe 10 may comprise, for example, a surface configured to abut against an end of a section of casing. In such embodiments, a weld groove may be defined between the casing shoe 10 and the section of casing along an interface therebetween by the abutting surfaces of the casing shoe 10 and the section of casing. The casing shoe 10 then may be welded to the section of casing along the interface and weld filler material may be deposited within the weld groove. In additional embodiments, the connection structure 18 on the casing shoe 10 may comprise a male or female threaded connector, such as a threaded pin or a threaded box having threads complementary to and configured to engage threads on an end of a section of casing.

Figure 7:
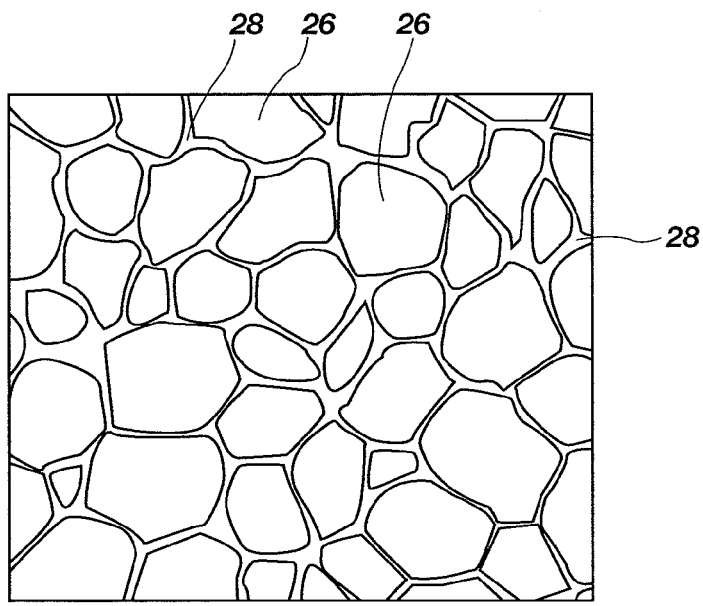
FIG. 7 schematically illustrates a corrodible composite material of the crown of the casing shoe of FIGS. 1A and 1B.

As previously mentioned, the body 16 of the casing shoe 10 may comprise a corrodible composite material. Referring briefly to FIG. 7, which schematically illustrates how a microstructure of the corrodible composite material of the body 16 may appear under magnification, the composite material of the body 16 may include a discontinuous metallic phase 26 dispersed within a corrodible matrix phase 28. In other words, the regions of the discontinuous metallic phase 26 may be cemented within and held together by the corrodible matrix phase 28.

The discontinuous metallic phase 26 may comprise a metal or metal alloy. In some embodiments, the metallic phase 26 may be formed from and comprise metal or metal alloy particles. Such particles may comprise nanoparticles in some embodiments. In other words, the discontinuous regions of the metal or metal alloy may be formed from and comprise particles having an average particle diameter of about one hundred nanometers (100 nm) or less. In other embodiments, the discontinuous regions of the metal or metal alloy may be formed from and comprise particles having an average particle diameter of between about one hundred nanometers (100 nm) and about five hundred microns (500 µm), between about five microns (5 µm) and about three hundred microns (300 µm), or even between about eighty microns (80 µm) and about one hundred twenty microns (120 µm).

Suitable materials for the discontinuous metallic phase 26 include electrochemically active metals having a standard oxidation potential greater than or equal to that of Zn. For example, the discontinuous metallic phase 26 may comprise Mg, Al, Mn or Zn, in commercially pure form, or an alloy or mixture of one or more of these elements. The discontinuous metallic phase 26 also may comprise tungsten (W) in some embodiments. These electrochemically active metals are reactive with a number of common wellbore fluids, including any number of ionic fluids or highly polar fluids, such as those that contain salts, such as chlorides, and/or acid. Examples include fluids comprising potassium chloride (KCl), hydrochloric acid (HCl), calcium chloride ($CaCl_2$), calcium bromide ($CaBr_2$) or zinc bromide ($ZnBr_2$). Metallic phase 26 may also include other metals that are less electrochemically active than Zn.

The metallic phase 26 may be selected to provide a high dissolution or corrosion rate in a predetermined wellbore fluid, but may also be selected to provide a relatively low dissolution or corrosion rate, including zero dissolution or corrosion, where corrosion of the matrix phase 28 causes the metallic phase 26 to be rapidly undermined and liberated from the composite material at the interface with the wellbore fluid, such that the effective rate of corrosion of the composite material is relatively high, even though metallic phase 26 itself may have a low corrosion rate. In some embodiments, the metallic phase 26 may be substantially insoluble in the wellbore fluid.

Among the electrochemically active metals, Mg, either as a pure metal or an alloy or a composite material, may be particularly useful for use as the metallic phase 26, because of its low density and ability to form high-strength alloys, as well as its high degree of electrochemical activity. Mg has a standard oxidation potential higher than those of Al, Mn or Zn. Mg alloys that combine other electrochemically active metals, as described herein, as alloy constituents also may be particularly useful, including magnesium-based alloys comprising one or more of Al, Zn, and Mn. In some embodiments, the metallic phase 26 may also include one or more rare earth elements such as Sc, Y, La, Ce, Pr, Nd and/or Er. Such rare earth elements may be present in an amount of about five weight percent (5 wt %) or less.

The metallic phase 26 may have a melting temperature ($T_P$). As used herein, $T_P$ means and includes the lowest temperature at which incipient melting occurs within the metallic phase 26, regardless of whether the metallic phase 26 is a pure metal, an alloy with multiple phases having different melting temperatures, or a composite of materials having different melting temperatures.

The corrodible matrix phase 28 has a chemical composition differing from that of the metallic phase 26. The corrodible matrix phase 28 may comprise at least one of a ceramic phase (e.g., an oxide, a nitride, a boride, etc.) and an intermetallic phase. In some embodiments, the corrodible matrix phase 28 may further include a metallic phase. For example, in some embodiments, the ceramic phase and/or the intermetallic phase of the corrodible matrix phase 28 may comprise at least one of an oxide, a nitride, and a boride of one or more of magnesium, aluminum, nickel, and zinc. If the corrodible matrix phase 28 includes a ceramic, the ceramic may comprise, for example, one or more of magnesium oxide, aluminum oxide, and nickel oxide. If the corrodible matrix phase 28 includes an intermetallic compound, the intermetallic compound may comprise, for example, one or more of an intermetallic of magnesium and aluminum, an intermetallic of magnesium and nickel, and an intermetallic of aluminum and nickel. The corrodible matrix phase 28 may comprise each of magnesium, aluminum, nickel, and oxygen in some embodiments. As a non-limiting example, the corrodible matrix phase 28 may comprise each of magnesium and oxygen, and may further include at least one of nickel and aluminum.

As a non-limiting example, in terms of elemental composition, the corrodible matrix phase 28 may comprise at least about fifty atomic percent (50 at %) magnesium in some embodiments. The corrodible matrix phase 28 may further comprise from zero atomic percent (0 at %) to about twenty atomic percent (20 at %) aluminum, from zero atomic percent (0 at %) to about ten atomic percent (10 at %) nickel, and from zero atomic percent (0 at %) to about ten atomic percent (10 at %) oxygen.

The corrodible matrix phase 28 may have a melting temperature ($T_C$). As used herein, $T_C$ means and includes the lowest temperature at which incipient melting occurs within the corrodible matrix phase 28, regardless of whether the matrix phase 28 is a ceramic, an intermetallic, a metal, or a composite including one or more such phases.

The composite material of the body 16 (FIGS. 1A and 1B) may have a composition that will corrode when exposed to a salt solution (e.g., brine) and/or an acidic solution. Further, the corrosion mechanism may be or include an electrochemical reaction occurring between one or more reagents in the salt solution and/or acidic solution (i.e., a salt or an acid), and one or more elements of the corrodible matrix phase 28. As a result of the reaction between the one or more reagents in the salt solution and/or acidic solution and one or more elements of the corrodible matrix phase 28, the corrodible matrix phase 28 may degrade.

Although the composite material of the body 16 is corrodible, the composite material of the body 16 has an initial strength sufficiently high to be suitable for use in the casing shoe 10 when the casing shoe 10 (FIGS. 1A and 1B) is used to drill a wellbore. For example, in some embodiments, the composite material of the body 16 may have an initial compressive yield strength of at least about 250 MPa prior to exposure to any corrosive environments. In some embodiments, the composite material of the body 16 may have an initial compressive yield strength of at least about 300 MPa prior to exposure to any corrosive environments.

Further, in some embodiments, the composite material of the body 16 may have a relatively low density. For example, in some embodiments, the composite material of the body 16 may have a density of about 2.5 gm/cm$^3$ or less at room temperature, or even about 2.0 gm/cm$^2$ or less at room temperature.

Figure 8:
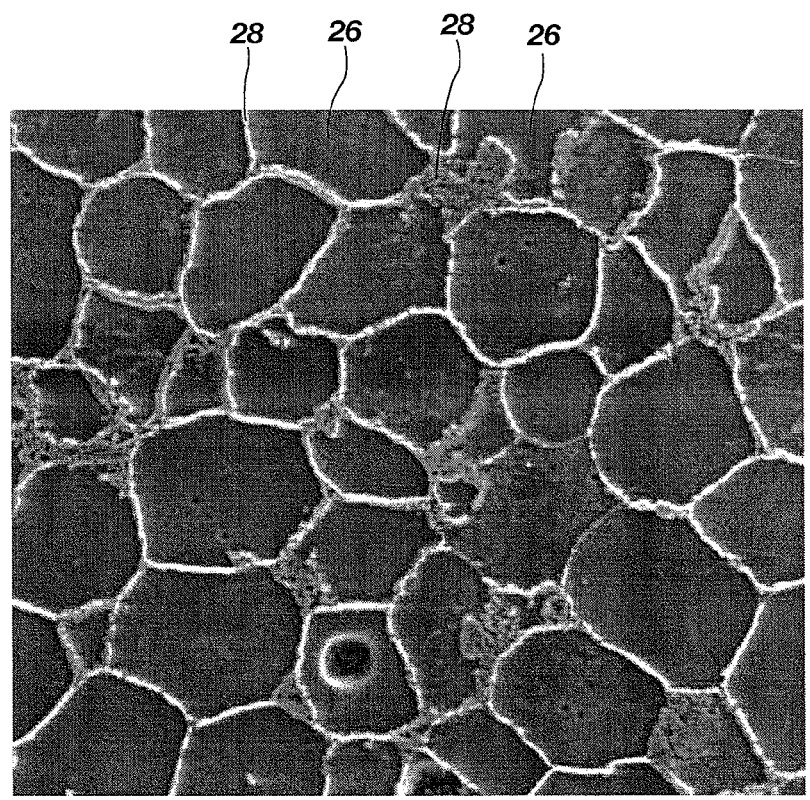
FIG. 8 is a photomicrograph of a corrodible composite material like that schematically illustrated in FIG. 7.

Although not shown in FIGS. 7 and 8, the composite material of the body 16 optionally may further include additional reinforcing phases, such as particles including a carbide, boride, or nitride of one or more of tungsten, titanium, and tantalum.

Figure 2:
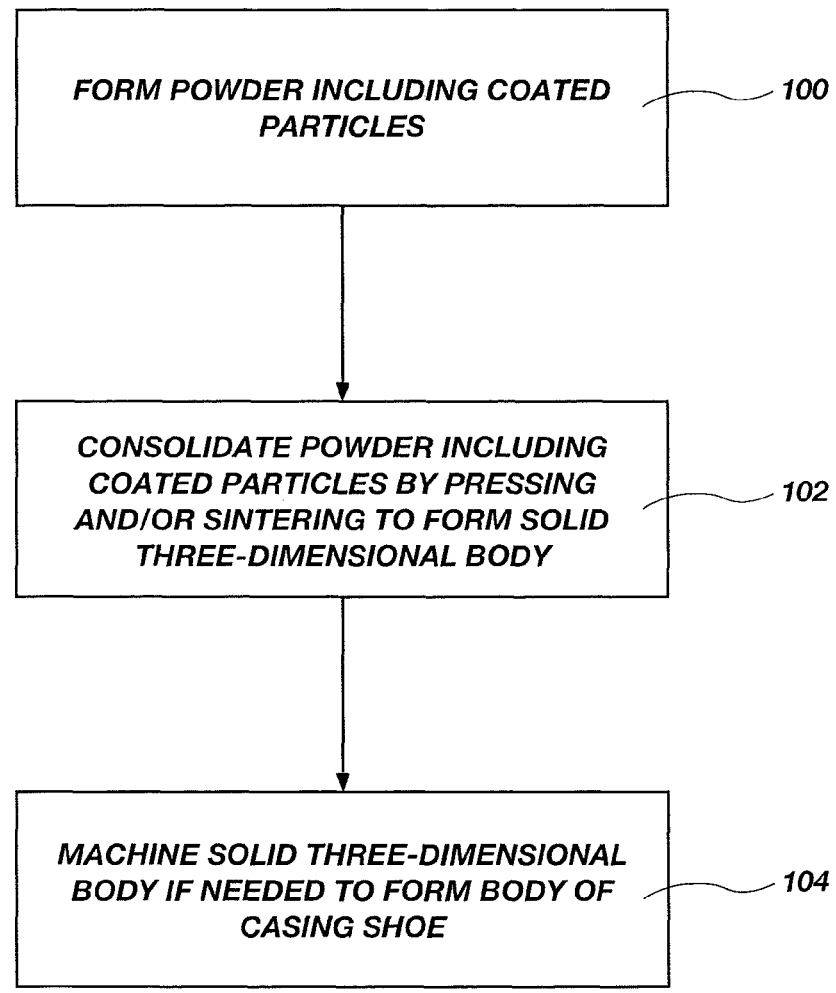
FIG. 2 is a flowchart illustrating an embodiment of a method that may be used to faun a casing shoe like that shown in FIGS. 1A and 1B.

The composite material of the body 16, and a method of forming the body 16 comprising the composite material, is described below with reference to FIGS. 2 through 8. FIG. 2 is a flowchart illustrating an embodiment of a method that may be used to form the body 16 of the casing shoe 10. Referring to FIG. 2, in action 100, a powder may be formed that includes coated particles. As discussed in further detail below, the particles may be used to form the discontinuous metallic phase 26 (FIG. 7) of the composite material of the body 16 of the casing shoe 10, and the coating on the particles may be used to faun the corrodible matrix phase 28 of the composite material of the body 16 of the casing shoe 10.

Figure 3:
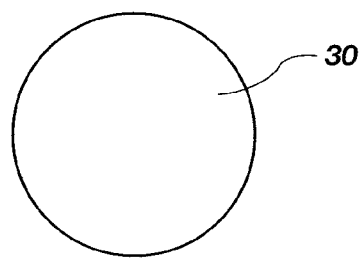
FIG. 3 schematically illustrates a metallic particle that may be used to form the corrodible composite material of the crown of the casing shoe of FIGS. 1A and 1B.
Figure 4:
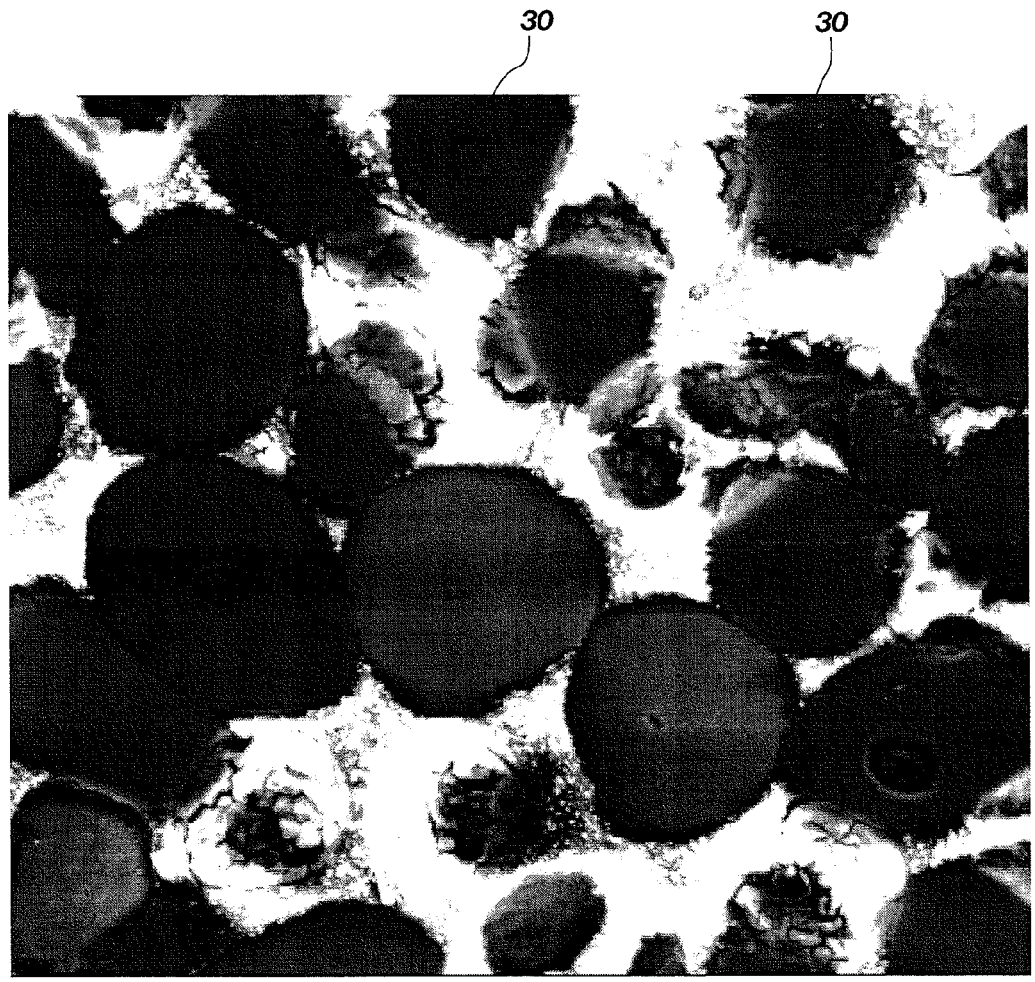
FIG. 4 is a photomicrograph of a plurality of metallic particles like that schematically illustrated in FIG. 3.

To form the powder, a plurality of particles like particle 30 schematically illustrated in FIG. 3 may be provided. In some embodiments, the particles 30 may comprise nanoparticles having an average particle diameter of about one hundred nanometers (100 nm) or less. In other embodiments, the particles 30 may have an average particle size (i.e., an average diameter) of between about one hundred nanometers (100 nm) and about five hundred microns (500 μm). Further, the particles 30 may have a mono-modal particle size distribution, or the particles 30 may have a multi-modal particle size distribution. The particles 30 may have a composition as previously described with reference to the discontinuous metallic phase 26. Although the particle 30 is schematically illustrated as being perfectly round in FIG. 3, in actuality, the particles 30 may not be perfectly round, and may have a shape other than round. FIG. 4 is a micrograph illustrating how the particles 30 may appear under magnification. As shown therein, the particles 30 (the dark shaded regions) may be of varying size and shape.

Figure 5:
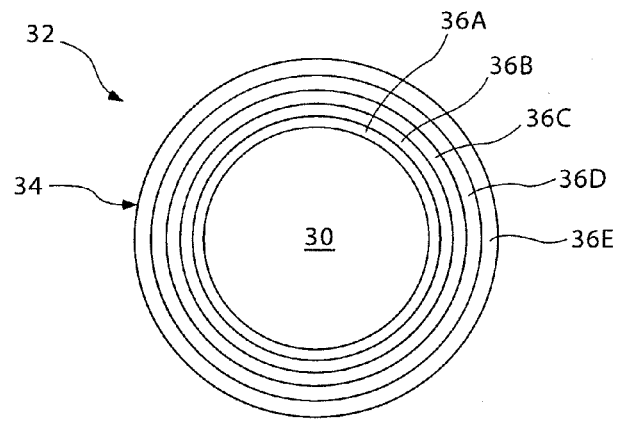
FIG. 5 schematically illustrates a particle like that of FIG. 3, but including a coating thereon comprising an oxide and/or an intermetallic compound, which may be used to faun the corrodible composite material of the crown of the casing shoe of FIGS. 1A and 1B.

Referring to FIG. 5, the particles 30 may be coated with one or more materials to form coated particles 32, each of which includes a core comprising a particle 30 and a coating 34 thereon. As shown in FIG. 5, in some embodiments the coating 34 may comprise a plurality of layers 36A, 36B, . . . 36N, wherein N is any number. In the particular non-limiting embodiment shown in FIG. 5, the coating 34 includes five layers 36A-36E. The coating 34 may have a composition as previously described with reference to the corrodible matrix phase 28 (FIG. 7). In embodiments in which the coating 34 includes a plurality of layers 36A, 36B, . . . 36N, the layers 36A, 36B, . . . 36N may have the same or different individual compositions. In embodiments in which the layers 36A, 36B, . . . 36N may have different individual compositions, each individual layer 36A, 36B, . . . 36N may have a composition as previously described with reference to the corrodible matrix phase 28.

In some embodiments, a first layer 36A may be selected to provide a strong metallurgical bond to the particle 30 and to limit interdiffusion between the particle 30 and the coating 34. A second layer 36B may be selected to increase a strength of the coating 34, or to provide a strong metallurgical bond and to promote sintering between adjacent coated particles 32, or both. Further, in some embodiments, one or more of the layers 36A, 36B, . . . 36N of the coating 34 may be selected to promote the selective and controllable dissolution or corrosion of the coating 34, and the matrix phase 28 (FIG. 7) resulting therefrom, in response to a change in a property within a drilling fluid in a wellbore. For example, any of the respective layers 36A, 36B, . . . 36N of the coating 34 may be selected to promote the selective and controllable dissolution or corrosion of the coating 34 in response to a change in a property within a drilling fluid in a wellbore.

Where the coating 34 includes a combination of two or more constituents, such as Al and Ni, for example, the combination may include various graded or co-deposited structures of these materials, and the amount of each constituent, and hence the composition of the layer, may vary across the thickness of the layer.

In an example embodiment, the particles 30 include Mg, Al, Mn or Zn, or a combination thereof, and more particularly may include pure Mg or a Mg alloy, and the coating 34 includes an oxide, nitride, carbide, boride, or an intermetallic compound of one or more of Al, Zn, Mn, Mg, Mo, W, Cu, Fe, Si, Ca, Co, Ta, Re, and Ni.

In another example embodiment, the particles 30 include Mg, Al, Mn or Zn, or a combination thereof, and more particularly may include pure Mg or a Mg alloy, and the coating 34 includes a single layer of one or more of Al or Ni.

In another example embodiment, the particles 30 include Mg, Al, Mn or Zn, or a combination thereof, and more particularly may include pure Mg or a Mg alloy, and the coating 34 includes two layers 36A, 36B including a first layer 36A of aluminum and a second layer 36B of nickel, or a two-layer coating 34 including a first layer 36A of aluminum and a second layer 36B of tungsten.

In another example embodiment, the particles 30 include Mg, Al, Mn or Zn, or a combination thereof, and more particularly may include pure Mg or a Mg alloy, and the coating 34 includes three layers 36A, 36B, 36C. The first layer 36A includes one or more of Al and Ni. The second layer 36B includes an oxide, nitride, or carbide of one or more of Al, Zn, Mg, Mo, W, Cu, Fe, Si, Ca, Co, Ta, Re and Ni. The third layer 36C includes one or more of Al, Mn, Fe, Co, and Ni.

In another example embodiment, the particles 30 include commercially pure Mg, and the coating 34 includes three layers 36A, 36B, 36C. The first layer 36A comprises commercially pure Al, the second layer 36B comprises aluminum oxide ($Al_2O_3$), and the third layer 36C comprises commercially pure Al.

In another example embodiment, the particles 30 include Mg, Al, Mn or Zn, or a combination thereof, and more particularly may include pure Mg or a Mg alloy, and the coating 34 includes four layers 36A, 36B, 36C, 36D. The first layer 36A may include one or more of Al and Ni. The second layer 36B includes an oxide, nitride, or carbide of one or more of Al, Zn, Mg, Mo, W, Cu, Fe, Si, Ca, Co, Ta, Re and Ni. The third layer 36C also includes an oxide, nitride, or carbide of one or more of Al, Zn, Mg, Mo, W, Cu, Fe, Si, Ca, Co, Ta, Re and Ni, but has a composition differing from that of the second layer 36B. The fourth layer 36D may include one or more of Al, Mn, Fe, Co, and Ni.

The one or more layers 36A, 36B, ... 36N of the coating 34 may be deposited on the particles 30 using, for example, a chemical vapor deposition (CVD) process or a physical vapor deposition (PVD) process. Such deposition processes optionally may be carried out in a fluidized bed reactor. Further, in some embodiments, the one or more layers 36A, 36B, ... 36N of the coating 34 may thermally treated (i.e., sintered, annealed, etc.) to promote the formation of a ceramic phase or an intermetallic phase from the various elements present in the coating 34 after the deposition process.

Figure 6:
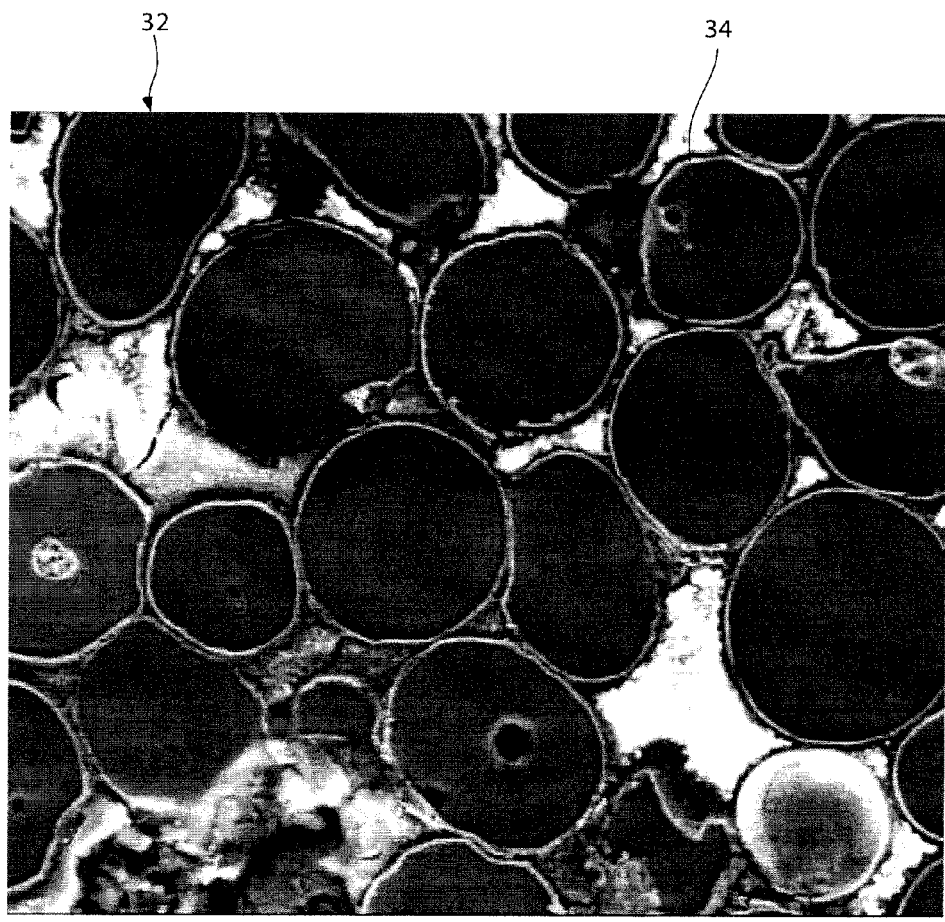
FIG. 6 is a photomicrograph of a plurality of coated metallic particles like that schematically illustrated in FIG. 5.

The coating 34 may have an average total thickness of about two and one-half microns (2.5 µm) or less. For example, the coating 34 may have an average total thickness of between about twenty-five nanometers (25 nm) and about two and one-half microns (2.5 µm). Further, although FIG. 5 illustrates the coating 34 as having an average thickness that is a significant percentage of the diameter of the particle 30, the drawings are not to scale, and the coating 34 may be relatively thin compared to the overall average diameter of the coated particles 32. FIG. 6 is a micrograph illustrating how the coated particles 32 may appear under magnification. As shown therein, the coatings 34, which are the light regions surrounding the particles 30 (the dark shaded regions), may have a thickness that is a relatively small percentage of the diameter of the core particles 30.

Referring again to FIG. 2, after providing the powder including the coated particles 32, the powder including the coated particles 32 may be consolidated in action 102 by pressing and/or heating (e.g., sintering) the powder to form a solid three-dimensional body. The solid three-dimensional body may comprise a billet having a generic shape, such as a block or cylinder. In other embodiments, the solid three-dimensional body may have a relatively more complex geometry, and may have a near-net shape like that of the body 16 of the casing shoe 10 in some embodiments.

For example, the powder including the coated particles 32 may be consolidated by pressing and heating the powder to form the solid three-dimensional body. The pressing and heating processes may be conducted sequentially, or concurrently. For example, in some embodiments, the powder including the coated particles 32 may be subjected to at least substantially isostatic pressure in, for example, a cold isostatic pressing process. In additional embodiments, the powder including the coated particles 32 may be subjected to directionally applied (e.g., uniaxial, biaxial, etc.) pressure in a die or mold. Such a process may comprise a hot-pressing process in which the die or mold, and the coated particles 32 contained therein, are heated to elevated temperatures while applying pressure to the coated particles 32. In some embodiments, a billet may be formed using a cold isostatic pressing process, after which the billet may be subjected to a hot pressing process in which the billet is further compressed within a heated die or mold to consolidate the coated particles 32.

The consolidation process of action 102 may result in removal of the porosity within the powder, and may result in the formation of the composite material shown in FIG. 7 from the coated particles 32 of FIG. 5. FIG. 8 is a micrograph showing how the microstructure of the resulting composite material of FIG. 7 may appear under magnification.

The consolidation process of action 102 may comprise a solid state sintering process, wherein the coated particles 32 are sintered at a sintering temperature $T_S$ that is less than both the melting point $T_P$ of the particles 30 (and the metallic phase 26) and the melting point $T_C$ of the coating 34 (and the corrodible matrix phase 28).

Referring again to FIG. 2, in action 104, the three-dimensional body formed by the consolidation process of action 102 optionally may be machined in action 104 to form the body 16 of the casing shoe 10 (FIGS. 1A and 1B) as needed or desirable. For example, one or more of milling, drilling, and turning processes may be used to machine the body 16 of the casing shoe 10 as needed or desirable. Such machining processes may be used to, for example, define the blades 22 and fluid courses 24 in the body 16, to form cutting element pockets in the blades 22, and/or to form the connection structure 18 (FIGS. 1A and 1B).

Figure 9:
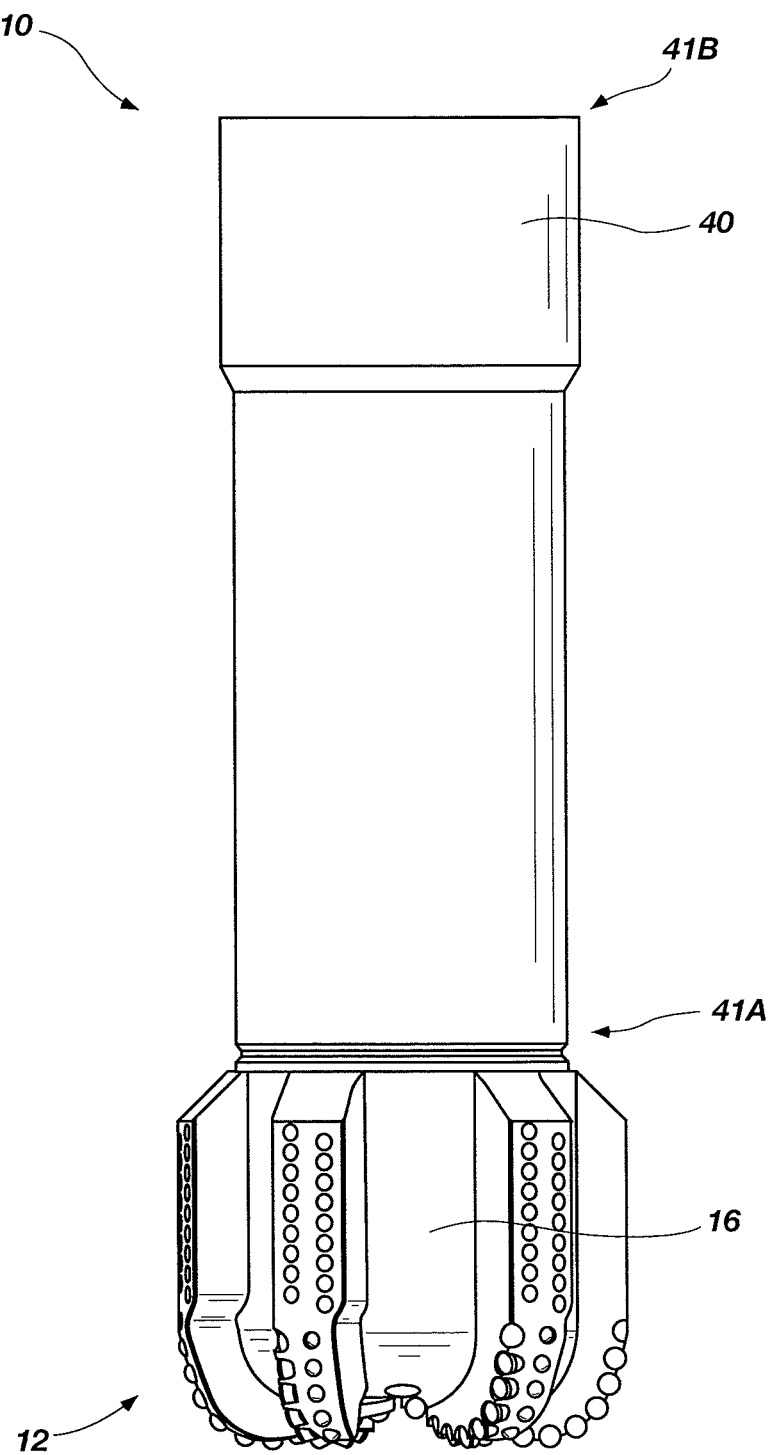
FIG. 9 illustrates a shank attached to the casing shoe of FIGS. 1A and 1B.

Referring to FIG. 9, the casing shoe 10 optionally may include a shank 40 having a first end 41A attached to the crown 12 and a second end 41B that may be adapted and used to couple the casing shoe 10 to a section of casing. In other words, the second end 41B of the shank 40 may comprise the connection structure, as previously described in relation to the connection structure 18 of FIGS. 1A and 1B. The shank 40 may comprise a material having a composition different from that of the body 16 of the crown 12. For example, in some embodiments, the shank 40 may comprise a steel alloy, such as those used to form wellbore casing sections. The crown 12 may be coupled to the shank 40 by, for example, providing cooperating, complementary threads on the crown 12 and the shank 40 and threading the crown 12 and the shank 40 together, by brazing the crown 12 to the shank 40, and/or by welding the crown 12 to the shank 40.

In some embodiments, the shank 40 may have a size and shape that allows it to be adapted, after attachment to the crown 12, for coupling to a wide variety of different casing configurations, as described in U.S. Patent Application Publication No. 2010/0252331 A1, published Oct. 7, 2010 in the name of High et al., the disclosure of which is incorporated herein in its entirety by this reference.

Figure 10A:
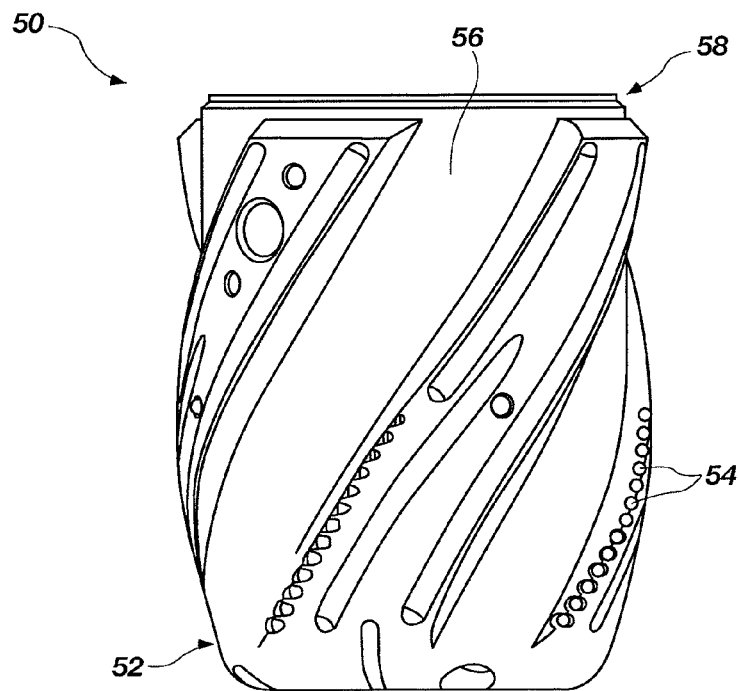
FIG. 10A is a side view of another embodiment of a casing shoe that includes a casing reamer crown comprising a corrodible composite material.
Figure 10B:
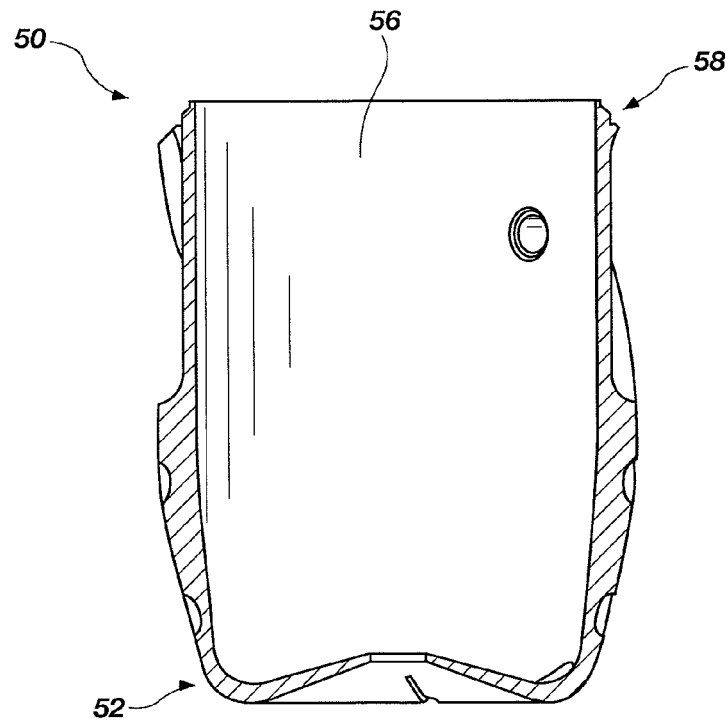
FIG. 10B is a cross-sectional side view of the casing shoe of FIG. 10A.
Figure 11:
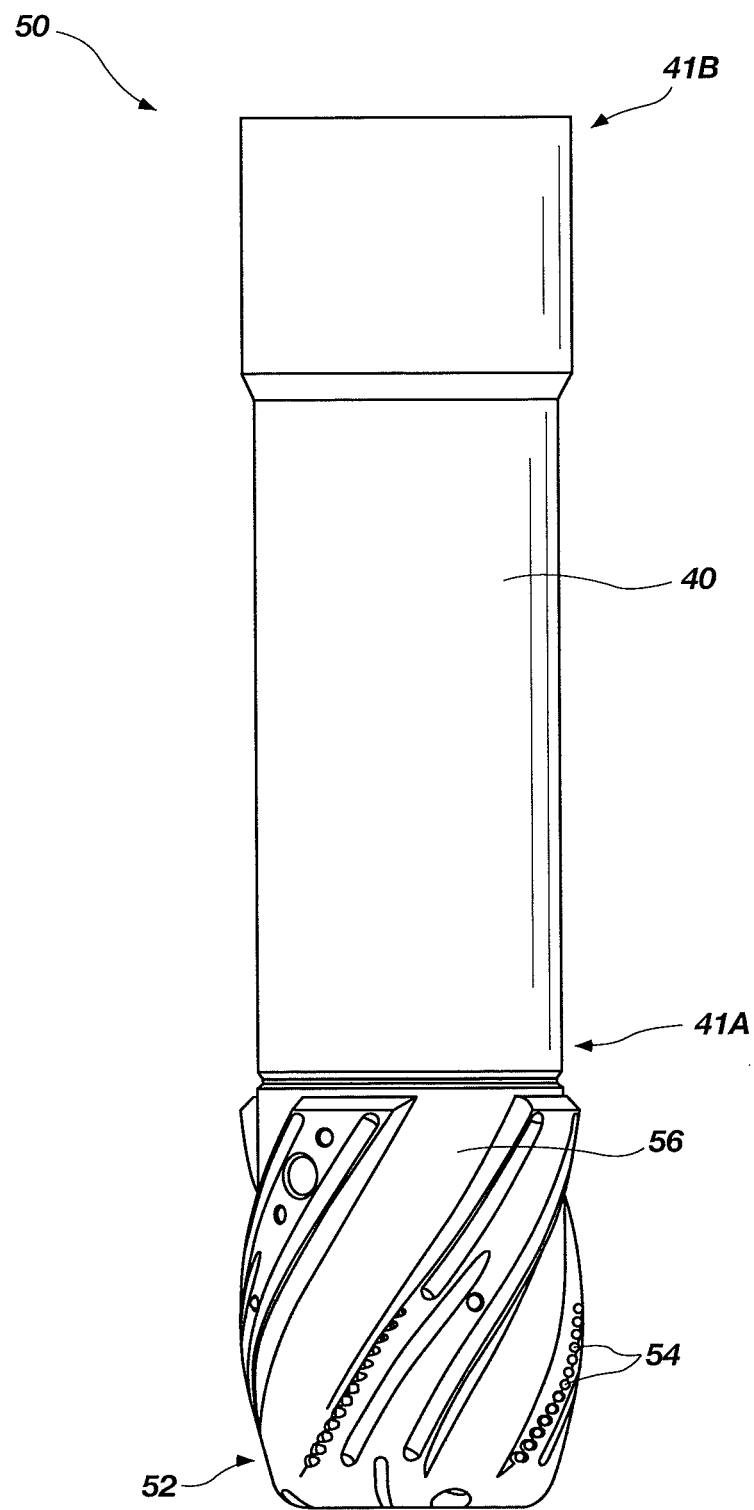
FIG. 11 illustrates a shank attached to the casing shoe of FIGS. 10A and 10B.

FIGS. 10A and 10B illustrate an additional embodiment of a casing shoe 50 of the disclosure. The casing shoe 50 is generally similar to the casing shoe 10 previously described with reference to FIGS. 1A and 1B, and includes a crown 52. The crown 52, however, is configured for reaming a wellbore (rather than drilling a wellbore) when the crown 52 is attached to a section of casing and the casing is advanced into a wellbore. Thus, the crown 52 includes at least one cutting structure 54 carried on a body 56 of the crown 52. For example, a plurality of PDC cutting elements and/or hardfacing deposits may be provided on the body 56 of the crown 52 for use as cutting structures. The crown 52 also includes a connection structure 58 configured for attachment to a section of casing, which may be as previously described in relation to the cutting structure 18 of FIGS. 1A and 1B. At least a portion of the body 56 of the crown 52 comprises a composite material that may be selectively corroded after using the casing shoe 50 for a period of service time, as previously described in relation to the composite material of the body 16 with reference to FIGS. 1A, 1B, and 2 through 8. Thus, after using the crown 52 to ream a wellbore, while casing on which the crown 52 is mounted is advanced into the wellbore, the body 56 of the crown 52 may be selectively corroded and degraded within the wellbore to allow additional casing sections and/or drill pipe to be inserted through the wellbore through and beyond the corroded and degraded casing shoe 50. As shown in FIG. 11, the casing shoe 50 of FIGS. 10A and 10B also may include a shank 40, as previously described with reference to FIG. 9.

Figure 12:
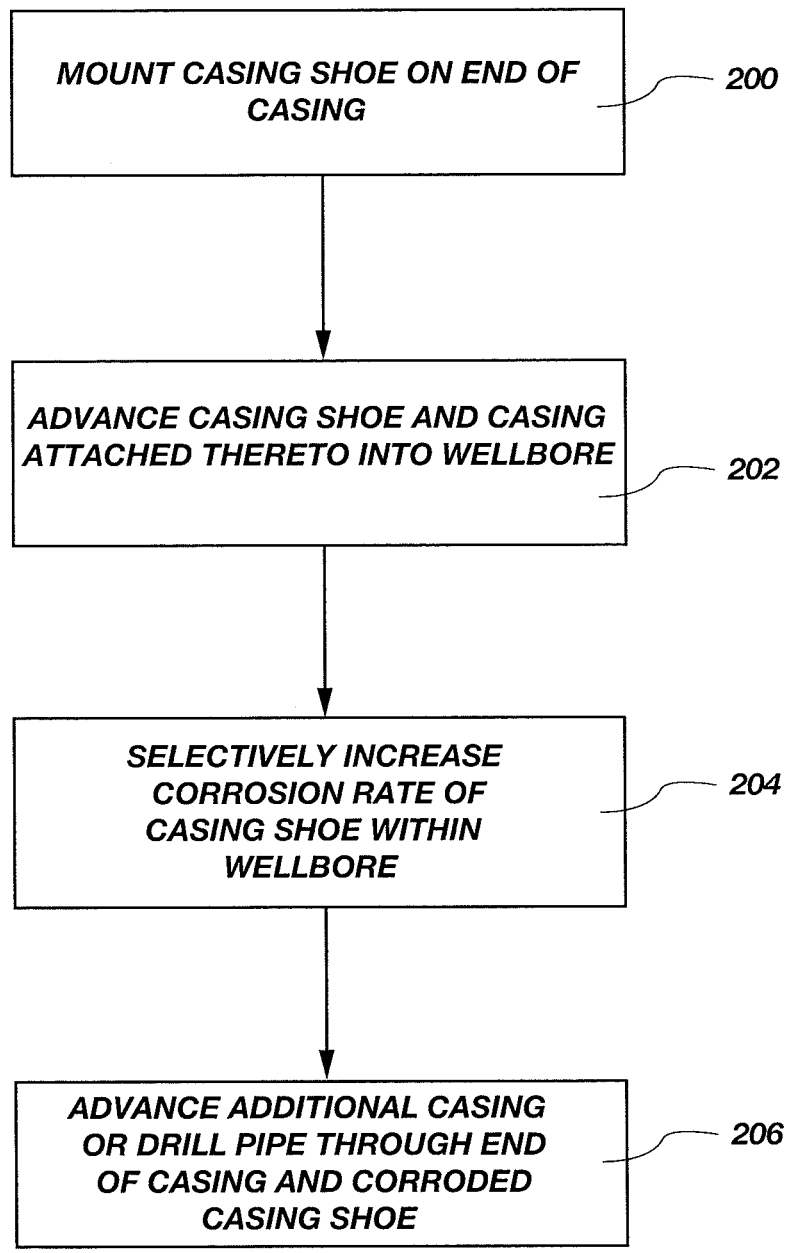
FIG. 12 is a flowchart illustrating an embodiment of a method that may be used to install casing within a wellbore using a casing shoe like that shown in FIGS. 1A and 1B or like that shown in FIGS. 10A and 10B.

Embodiments of the disclosure also include methods of casing a wellbore using embodiments of casing shoes as disclosed herein, such as the casing shoes 10, 50 (FIGS. 1A, 1B, 10A and 10B). FIG. 12 is a flowchart illustrating an embodiment of a method that may be used to install casing within a wellbore using a casing shoe 10, 50 of the present disclosure. In action 200, a casing shoe 10, 50 may be mounted on an end of a section of casing. The connection structure 18, 58 of the casing shoe 10, 50 may be used to mechanically couple, weld, braze, or otherwise attach the casing shoe 10, 50 to the end of the section of casing. In action 202, the casing with the casing shoe 10, 50 attached to the distal end thereof is advanced into the wellbore and used to drill and/or ream the wellbore and simultaneously line the wellbore with the casing to which the casing shoe 10, 50 is attached.

Once the casing has been advanced to a desirable location within the formation, drilling and/or reaming with the casing shoe 10, 50 may be ceased, and the casing may be cemented in place. To cement the casing in place, cement (not shown) or another curable material may be forced through the interior of casing, through apertures in the crown 12, 52 (FIGS. 1A, 1B, 9, 10A, 10B and 11), and up through the annulus between the wall of wellbore and the outer surface of the casing, where it may be allowed to harden. Conventional float equipment may be used for controlling and delivering the cement through the casing shoe 10, 50 and into the annulus between the wall of the wellbore and the casing. Cementing the casing in place within the wellbore may stabilize the wellbore and seal the subterranean formations penetrated by the casing shoe 10, 50 and the casing.

With continued reference to FIG. 12, after the casing shoe 10, 50 has been used to install the casing attached thereto within the wellbore, a rate of corrosion of the casing shoe 10, 50 within the wellbore may be selectively increased in accordance with action 204. By way of example and not limitation, a salt and/or acid content within drilling fluid being pumped down the wellbore through the casing and the casing shoe 10, 50 may be selectively increased. As previously described, the body 16, 56 of the casing shoe 10, 50 may comprise a composite material that may have a composition that will corrode when exposed to a salt solution (e.g., brine) and/or an acidic solution. Further, the corrosion mechanism may be or may include an electrochemical reaction occurring between one or more reagents in the salt solution and/or acidic solution (i.e., a salt or an acid), and one or more elements of a corrodible matrix phase 28 (FIG. 7) of the composite material. As a result of the reaction between the one or more reagents in the salt solution and/or acidic solution and one or more elements of the corrodible matrix phase 28, the corrodible matrix phase 28 may degrade. Thus, the body 16, 56 of the casing shoe 10, 50, respectively, may be selectively corroded and degraded within the wellbore after using the casing shoe 10, 50 for a period of service time.

Figure 13:
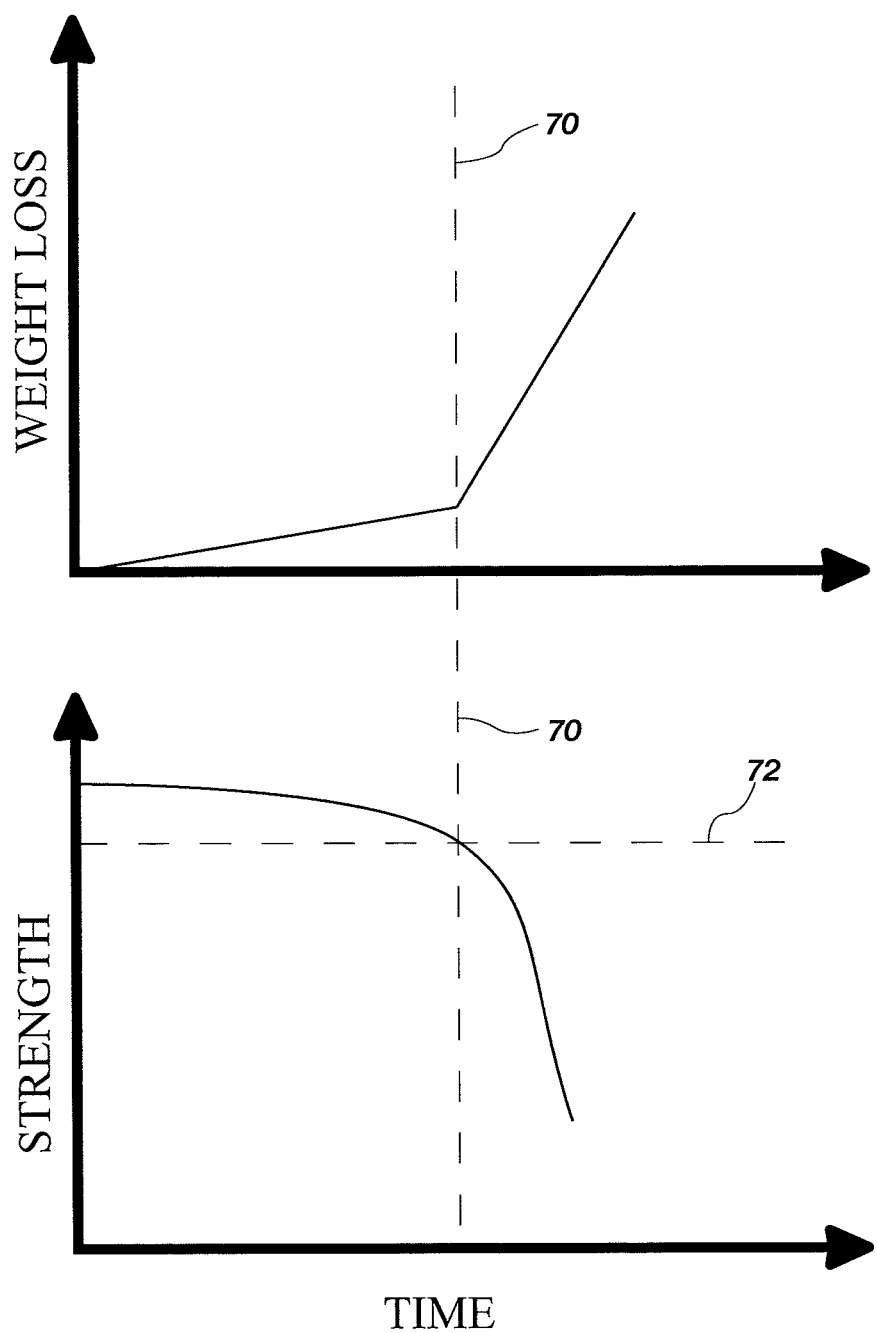
FIG. 13 includes a first graph generally illustrating the weight loss of the crown of a casing shoe, such as the casing shoe of FIGS. 1A and 1B or the casing shoe of FIGS. 10A and 10B, as a function of service time of the casing shoe, and a second graph generally illustrating the strength of the crown of the casing shoe as a function of the service time of the casing shoe.

The selective increase in the rate of corrosion of the casing shoe 10, 50 is further illustrated with reference to FIG. 13, which includes a first graph (at the top of FIG. 13) generally illustrating the weight loss of the crown 12, 52 of the casing shoe 10, 50 (FIGS. 1A, 1B, 9, 10A, 10B and 11) as a function of service time of the casing shoe 10, 50, and a second graph (at the bottom of FIG. 13) generally illustrating the strength of the crown 12, 52 of the casing shoe 10, 50 as a function of the service time of the casing shoe 10, 50. An intended service time 70 is indicated in FIG. 13 by a vertically extending dashed line. The intended service time 70 may be a period of time over which the casing shoe 10, 50 should remain sufficiently strong so as to enable the casing shoe 10, 50 to be used to drill and/or ream a wellbore as a section of casing to which the casing shoe 10, 50 is attached is advanced into a wellbore, as previously described. The intended service time 70 may be the period of time required to position the casing to which the casing shoe 10, 50 is attached at an intended location within the wellbore. The rate at which weight is lost from the casing shoe 10, 50 prior to the intended service time 70 (due, for example, to wear, erosion, and corrosion) is represented by the slope of the line to the left of the intended service time 70. As shown in FIG. 13, after the intended service time 70, the rate at which the body 16, 56 corrodes within the wellbore may be selectively increased, such that the rate at which weight is lost from the casing shoe 10, 50 is higher, as represented by the higher slope of the line to the right of the intended service time 70. For example, a salt content and/or an acid content in the drilling fluid may be selectively increased at the intended service time 70 and maintained at a higher concentration thereafter until the casing shoe 10, 50 has sufficiently corroded.

The strength of the body 16, 56 of the casing shoe 10, 50 will decrease as weight is lost from the body 16, 56 of the casing shoe 10, 50 due to wear, erosion, and/or corrosion. As previously described, it may be desirable to maintain a strength of the body 16, 56 of the casing shoe 10, 50 above a threshold strength 72, until reaching the intended service time 70. By way of example and not limitation, the threshold strength 72 may be a compressive yield strength of at least about 250 MPa, of even at least about 300 MPa. Once the intended service time 70 is reached, however, it may be desirable to decrease the strength of the body 16, 56 of the casing shoe 10, 50 below the threshold strength 72 so as to facilitate subsequently advancing an additional section of casing or drill pipe through the body 16, 56 of the casing shoe 10, 50. Thus, due to the increased rate of corrosion of the body 16, 56 of the casing shoe 10, 50, additional weight may be lost from the body 16, 56 of the casing shoe 10, 50, resulting in a decrease in the strength of the body 16, 56 of the casing shoe 10, 50 as shown in FIG. 13.

Referring again to FIG. 12, after corroding the body 16, 56 of the casing shoe 10, 50, in action 206, an additional section of casing or drill pipe may be advanced through the previously installed section of casing and through the corroded body 16, 56 of the casing shoe 10, 50 at the end thereof. Thus, embodiments of the present invention may be employed to enable drilling and/or reaming of additional sections of a wellbore beyond previously installed sections of casing to which a casing shoe 10, 50 was attached and used to drill and/or ream a previous section of the wellbore.

In additional embodiments of the disclosure, the corrodible composite materials of the body 16, 56 of the casing shoe 10, 50 as described herein may be used to form other components or features of the casing shoe 10, 50. For example, the corrodible composite materials may be used to form nozzle bodies, cutting element substrates, and other types of inserts that are carried by the body 16, 56 of the casing shoe 10, 50.

Those of ordinary skill in the art will recognize and appreciate that the invention is not limited by the certain example embodiments described hereinabove. Rather, many additions, deletions and modifications to the embodiments described herein may be made without departing from the scope of the invention, which is defined by the appended claims and their legal equivalents. In addition, features from one embodiment may be combined with features of another embodiment while still being encompassed within the scope of the invention as contemplated by the inventors.

What is claimed is:

1. A method of casing a wellbore, comprising:
    mounting a casing shoe having at least one cutting structure on an end of a section of casing;
    advancing the section of casing with the casing shoe thereon into a wellbore;
    selectively increasing a rate of corrosion of a body of the casing shoe within the wellbore to at least partially corrode the body of the casing shoe, wherein selectively increasing the rate of corrosion of the body comprises increasing a rate of corrosion of a corrodible matrix phase comprising at least one of a ceramic and an intermetallic compound in which a metallic phase is dispersed by selectively increasing the rate of corrosion of the corrodible matrix phase dispersed between adjacent discrete metallic particles of the metallic phase and liberating particles of the metallic phase from the corrodible matrix phase without substantially increasing a rate of corrosion of the metallic phase; and
    advancing an additional section of casing or drill pipe through the end of the section of casing and the at least partially corroded body of the casing shoe.

2. The method of claim 1, wherein selectively increasing a rate of corrosion of the body of the casing shoe within the wellbore comprises:
    increasing a concentration of at least one of a salt and an acid within a drilling fluid; and
    flowing the drilling fluid through the body of the casing shoe.

3. The method of claim 2, wherein selectively increasing the rate of corrosion of the body of the casing shoe within the wellbore to at least partially corrode the body of the casing shoe further comprises corroding the body of the casing shoe using an electrochemical reaction.

4. The method of claim 1, wherein increasing a rate of corrosion of a corrodible matrix phase comprising at least one of a ceramic and an intermetallic compound in which a metallic phase is dispersed comprises increasing a rate of corrosion of the corrodible matrix phase comprising at least one of an oxide, a nitride, and a boride of one or more of magnesium, aluminum, nickel, and zinc.

5. The method of claim 1, wherein increasing a rate of corrosion of a corrodible matrix phase comprising at least one of a ceramic and an intermetallic compound in which a metallic phase is dispersed comprises increasing a rate of corrosion of the corrodible matrix phase comprising magnesium, oxygen, and at least one of nickel and aluminum.

6. The method of claim 1, wherein increasing a rate of corrosion of a corrodible matrix phase comprising at least one of a ceramic and an intermetallic compound in which a metallic phase is dispersed comprises increasing a rate of corrosion of the corrodible matrix phase comprising at least about fifty atomic percent (50 at %) magnesium.

7. The method of claim 1, wherein increasing a rate of corrosion of a corrodible matrix phase comprising at least one of a ceramic and an intermetallic compound in which a metallic phase is dispersed comprises increasing a rate of corrosion of the corrodible matrix phase comprising at least about fifty atomic percent (50 at %) magnesium, between zero atomic percent (0 at %) and about twenty atomic percent (20 at %) aluminum, between zero atomic percent (0 at %) and about ten atomic percent (10 at %) nickel, and between zero atomic percent (0 at %) and about ten atomic percent (10 at %) oxygen.

8. The method of claim 1, wherein increasing a rate of corrosion of a corrodible matrix phase comprising at least one of a ceramic and an intermetallic compound in which a metallic phase is dispersed comprises increasing a corrosion rate of one or more of an intermetallic of magnesium and aluminum, an intermetallic of magnesium and nickel, and an intermetallic of aluminum and nickel.

9. The method of claim 1, wherein increasing a rate of corrosion of a corrodible matrix phase comprising at least one of a ceramic and an intermetallic compound in which a metallic phase is dispersed comprises liberating discrete particles of magnesium or a magnesium alloy coated with at least one of an oxide, a nitride, a carbide, a boride or an intermetallic compound comprising one or more of Al, Zn, Mn, Mg, Mo, W, Cu, Fe, Si, Ca, Ta, Re, and Ni.

10. The method of claim 1, wherein increasing a rate of corrosion of a corrodible matrix phase comprising at least one of a ceramic and an intermetallic compound in which a metallic phase is dispersed comprises reacting a drilling fluid with a coating comprising at least two layers surrounding discrete particles of the metallic phase.

11. The method of claim 10, wherein reacting a drilling fluid with a coating comprising at least two layers surrounding discrete particles of the metallic phase comprises reacting a drilling fluid with a coating comprising a first layer of aluminum and a second layer of nickel.

12. The method of claim 1, wherein increasing a rate of corrosion of a corrodible matrix phase comprising at least one of a ceramic and an intermetallic compound in which a metallic phase is dispersed comprises reacting the intermetallic compound with a fluid comprising at least one of potassium chloride, calcium chloride, calcium bromide, and zinc bromide.

13. The method of claim 12, wherein reacting the intermetallic compound with a fluid comprising at least one of potassium chloride, calcium chloride, calcium bromide, and zinc bromide comprises reacting magnesium with at least one of potassium chloride, calcium chloride, calcium bromide, and zinc bromide.

14. The method of claim 1, wherein mounting a casing shoe having at least one cutting structure on an end of a section of casing comprises threading the casing shoe to an end of a section of casing.

15. A method of casing a wellbore, comprising:
    mounting a casing shoe on an end of a section of casing;
    cementing the section of casing within a wellbore; and
    at least partially corroding a body of the casing shoe by increasing a rate of corrosion of a corrodible matrix phase comprising at least one of an oxide, a nitride, a carbide, and a boride in which a discontinuous metallic phase is dispersed by exposing the casing shoe to a salt solution.

16. The method of claim 15, wherein increasing a rate of corrosion of a corrodible matrix phase comprising at least one of an oxide, a nitride, a carbide, and a boride in which a discontinuous metallic phase is dispersed comprises increasing a rate of corrosion of a coating comprising an average thickness of about two and one half microns (2.5 μm) or less.

17. A method of casing a wellbore, comprising:
mounting a casing shoe on an end of a section of casing;
advancing the casing shoe and the section of casing into a wellbore; and
increasing a rate of corrosion of a composite material of the casing shoe to at least partially corrode the casing shoe by increasing a corrosion rate of the composite material comprising a corrodible matrix phase and a plurality of discrete metallic particles by increasing a corrosion rate of at least one of magnesium oxide, aluminum oxide, and nickel oxide of the corrodible matrix phase.

18. The method of claim 17, wherein increasing a corrosion rate of the composite material comprising a corrodible matrix phase and a plurality of discrete metallic particles comprises increasing a corrosion rate of the composite material comprising a corrodible matrix phase and a plurality of discrete metallic particles having an average particle diameter of about one hundred nanometers (100 nm) or less.

* * * * *